United States Patent
Healy

(10) Patent No.: US 7,532,742 B2
(45) Date of Patent: May 12, 2009

(54) TWO-WHEEL ALIGNMENT ADJUSTMENT METHOD

(75) Inventor: Donald A. Healy, Conway, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 630 days.

(21) Appl. No.: 10/902,128

(22) Filed: Jul. 30, 2004

(65) Prior Publication Data
US 2005/0041239 A1    Feb. 24, 2005

Related U.S. Application Data

(60) Provisional application No. 60/491,276, filed on Jul. 31, 2003.

(51) Int. Cl.
*G06K 9/00* (2006.01)
(52) U.S. Cl. ...................................................... 382/103
(58) Field of Classification Search ........................ None
See application file for complete search history.

(56) References Cited

U.S. PATENT DOCUMENTS

| | | | |
|---|---|---|---|
| 4,126,943 A | | 11/1978 | Senften |
| 4,143,970 A | | 3/1979 | Lill |
| 4,249,824 A | * | 2/1981 | Wiederrich et al. ......... 356/155 |
| 4,302,104 A | * | 11/1981 | Hunter ................... 356/139.09 |
| 4,319,838 A | | 3/1982 | Grossman et al. |
| 4,594,789 A | * | 6/1986 | Marino et al. .................. 33/288 |
| 4,761,749 A | * | 8/1988 | Titsworth et al. ........... 700/279 |
| 4,931,964 A | | 6/1990 | Titsworth et al. |
| 5,488,472 A | * | 1/1996 | January ................. 356/139.09 |
| 5,535,522 A | | 7/1996 | Jackson |
| 5,586,062 A | * | 12/1996 | Colarelli, III ............... 700/279 |
| 5,724,129 A | | 3/1998 | Matteucci |
| 5,724,743 A | * | 3/1998 | Jackson ....................... 33/288 |
| 5,809,658 A | | 9/1998 | Jackson et al. |
| 5,943,783 A | | 8/1999 | Jackson |
| 6,134,792 A | | 10/2000 | January |

(Continued)

FOREIGN PATENT DOCUMENTS

WO    WO 01/23834    4/2001

OTHER PUBLICATIONS

0005810716, Datastar Machine vision-based alignment, Christian-D-J et al, SPIE , 1997 vol. 3205 pp. 218-225.*

(Continued)

*Primary Examiner*—Jingge Wu
*Assistant Examiner*—Jayesh A Patel
(74) *Attorney, Agent, or Firm*—McDermott Will & Emery LLP

(57) ABSTRACT

A method for measuring and aligning wheels of a vehicle using a machine vision alignment apparatus including optical scanning devices and optically scannable targets. The method includes prompting a user of the alignment apparatus to choose between a standard alignment and a two-wheel alignment, conducting a standard alignment if the user chooses a standard alignment, prompting the user to choose between two targets or four targets if the user chooses a two-wheel alignment, conducting a two-wheel, two-target alignment procedure using the optical scanning devices if the user chooses two targets, and conducting a two-wheel, four-target alignment procedure using the optical scanning devices if the user chooses four targets.

11 Claims, 8 Drawing Sheets

U.S. PATENT DOCUMENTS

| | | | |
|---|---|---|---|
| 6,148,528 | A | 11/2000 | Jackson |
| 6,237,234 | B1 | 5/2001 | Jackson et al. |
| 6,498,959 | B1 * | 12/2002 | January et al. ................. 700/56 |
| 6,532,062 | B2 * | 3/2003 | Jackson et al. ......... 356/139.09 |
| 6,560,883 | B2 * | 5/2003 | Jackson et al. ................. 33/203 |
| 2002/0001076 | A1 * | 1/2002 | Jackson et al. ......... 356/139.09 |
| 2002/0027651 | A1 * | 3/2002 | Jackson et al. ......... 356/139.09 |
| 2003/0051356 | A1 | 3/2003 | Jackson et al. |
| 2003/0065466 | A1 | 4/2003 | Jackson et al. |
| 2005/0022398 | A1 * | 2/2005 | Healy ...................... 33/203.18 |

OTHER PUBLICATIONS

"Wheel Alignment", Arago™ Technology V3D³ 2$^{nd}$ To None, John Bean.

"OPTO-PLUS 618" Computer Wheel Aligner, The 8-sensor "Around the Car" measurement optimizes 4-Wheel alignment.

"Wheel Balance and Alignment", Chapter 14.

"WinAlign HD", Wheel Alignment Education Guide for Heavy-Duty Trucks, Hunter Engineering Company.

Hunter Series 311, Series 311 Upgradeable Computerized Wheel Alignment System.

DSP400 Sensor Specifications and Options, DSP400 Alignment Sensors.

"211/411 to 611 Upgrade", Form 4414T. Jul. 1999.

Series 611 Computerized Wheel Alignment System, Form 4484T. May 2000.

DSP250 & 300 Series Sendors For Hunter Computerized wheel Alignment Systems.

Specialty Products Company, "Basic Wheel Alignment Fundamentals".

Hunter Engineering Company Product Literature, Form No. 2016T dated Sep. 1988, "System Digital Wheel Aligner." Select pages including index and pp. 7-13 describing alignment sequences for two-sensor and four-sensor alignment procedures (10 pages total).

Hunter Engineering Company Product Literature, Form No. 1373T, dated Nov. 1978, "3 Lines" describing two-sensor and four-sensor alignment procedures using S7-TA Electron-A-Line equipment. (16 pages total).

* cited by examiner

TWO-WHEEL ALIGNMENT ADJUSTMENT METHOD

CROSS-REFERENCE TO RELATED APPLICATION

The present application claims priority from co-pending provisional U.S. patent application Ser. No. 60/491,276, filed Jul. 31, 2003, which is incorporated herein by reference in its entirety.

FIELD OF THE DISCLOSURE

The present disclosure generally relates to motor vehicle maintenance equipment and methods and, more specifically, to a method for measuring and adjusting the alignment of front wheels of a motor vehicle.

BACKGROUND OF THE DISCLOSURE

Motor vehicle alignment systems are important for ensuring that the alignments of wheels on a vehicle are within the specifications provided by motor vehicle manufacturers. If the wheels are out of alignment, there may be excessive or uneven wear of the tires and vehicle suspension system. In addition, the performance of the vehicle, particularly handling and stability, may be adversely affected if the wheels are not properly aligned. As used herein, the term "wheel" or "vehicle wheel" refers to the tire and wheel assembly found on a motor vehicle. Such an assembly generally includes a conventional tire that is mounted on a metal wheel or "rim."

The wheels of a motor vehicle may be aligned in a number of ways. For example, an operator or an alignment technician can use a vision imaging system such as a computer-aided, three-dimensional (3D) machine vision that employs optical sensing devices, such as cameras, to determine the positions of targets attached to the wheels of a vehicle. Examples of such apparatus and methods are disclosed in U.S. Pat. No. 5,724,743, entitled "Method and Apparatus for Determining the Alignment of Motor Vehicle Wheels" issued to Jackson, et al. on Mar. 10, 1998; U.S. Pat. No. 5,535,522, entitled "Method and Apparatus for Determining the Alignment of Motor Vehicle Wheels" issued to Jackson, et al. on Jul. 16, 1996; and Published U.S. patent application No. U.S. 2003/0065466A1, published Apr. 3, 2003, to Jackson, et al. and entitled "Self-Calibrating, Multi-Camera Machine Vision Measuring System". All three of these patents and patent application are assigned to the assignee of the present invention and incorporated herein by reference. The Visualiner 3D$^3$ Arago™ Aligner (Model # EEWA533A), for example, is a vision imaging alignment system that is available from the John Bean Company of Conway, Ark. (www.johnbean.com).

During an alignment process, a number of parameters are measured and adjusted to achieve proper wheel alignment. These parameters can include, for example, camber, caster, steering axis inclination (SAI), toe, turning angle, thrust line, scrub radius and setback.

Camber is the angle of the wheel, measured in degrees, when viewed from the front of the vehicle. If the top of the wheel is leaning out from the center of the car, then the camber is positive, if the top of the wheel is leaning in, then the camber is negative. If the camber is out of adjustment, it will cause tire wear on one side of the tire's tread.

Caster is the angle of a steering pivot that the front wheels turn on, measured in degrees, when viewed from the side of the vehicle. If the top of the pivot is leaning toward the rear of the car, then the caster is positive, if the top of the pivot is leaning toward the front of the car, then the caster is negative. If the caster is out of adjustment, it can cause problems in straight line tracking.

SAI is the measurement in degrees of the steering pivot line when viewed from the front of the vehicle. This angle causes the vehicle to lift slightly when the wheel is turned away from a straight ahead position, so that the weight of the vehicle causes the steering wheel to re-center when let go after making a turn. If the SAI is different from side to side, the SAI will cause a pull at very slow speeds. Included angle is the angle formed between the SAI and the camber.

The toe measurement is the difference in the distance between the front of the tires and the back of the tires. The toe is usually set close to zero which means that the wheels are parallel with each other. Toe-in means that the fronts of the tires are closer to each other than the rears. Toe-out is just the opposite. An incorrect toe will cause rapid tire wear to both tires equally. When a vehicle is turned, the inner front wheel must toe-out more than the outer front wheel. Measurement of toes during turning is referred to as turning angle.

Scrub radius is the distance between where the SAI intersects the ground and the center of the tire. This distance must be exactly the same from side to side or the vehicle will pull strongly at all speeds. Setback is when one front wheel is set further back than the other wheel. Thrust angle is the direction that the rear wheels are pointing in relation to the center line of the vehicle. If the thrust angle is not zero, then the vehicle will "dog track" and the steering wheel will not be centered. Steering center is simply the fact that the steering wheel is centered when the vehicle is traveling down a straight and level road.

A typical alignment procedure utilizing a vision imaging system includes first attaching targets to all four wheels of the vehicle. Then, individual wheel positioning is done on all four wheels, and target information is collected on all four wheels.

Sometimes, however, it may be desirable to simply conduct an alignment procedure on the two front wheels of a vehicle. For example, if the vehicle is large, such as a truck, bus or mobile home, or if portions of the vehicle's body would obstruct the viewing of targets on the rear wheels, then it may be desired to conduct the alignment procedure on just the two front wheels of the vehicle.

Based on the foregoing, there is a clear need in this field for a new and improved method for measuring and adjusting the alignment of the wheels of a motor vehicle utilizing a vision imaging system. In particular, what is needed is a new and improved method for measuring and adjusting the alignment of the wheels of a motor vehicle utilizing a vision imaging system that allows an alignment technician to only conduct an alignment procedure on the two front wheels of the vehicle if desired.

SUMMARY OF THE DISCLOSURE

The present disclosure accordingly provides a method for measuring and aligning wheels of a vehicle using a machine vision alignment apparatus including optical scanning devices and optically scannable targets. The method generally includes prompting a user of the alignment apparatus to choose between a standard alignment procedure and a two-wheel alignment procedure, and conducting a standard alignment procedure if the user chooses a standard alignment. If the user chooses a two-wheel alignment, then the method further includes prompting the user to choose between two targets or four targets, and conducting a two-wheel, two-target alignment procedure using the optical scanning devices if the user chooses two targets, and conducting a two-wheel, four-target alignment procedure using the optical scanning devices if the user chooses four targets.

The present invention provides a new and improved method for measuring and adjusting the alignment of the wheels of a motor vehicle utilizing a vision imaging system. In particular, the present invention provides a new and improved method for measuring and adjusting the alignment of the wheels of a motor vehicle utilizing a vision imaging system that allows an alignment technician to only conduct an alignment procedure on the two front wheels of the vehicle if desired.

The present invention also provides the method in one or more sequences of instructions carried on a computer-readable medium and executable by one or more processors. An apparatus for measuring and aligning wheels of a vehicle is also provided and includes optically scannable targets attachable to the wheels, optical scanning devices for providing images of the targets, and a data processor operatively connected to the optical scanning devices and programmed to carry out the methods of the present invention.

Additional aspects and advantages of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference character designations represent like elements throughout, and wherein.

DETAILED DESCRIPTION OF THE DISCLOSURE

Figure 3:
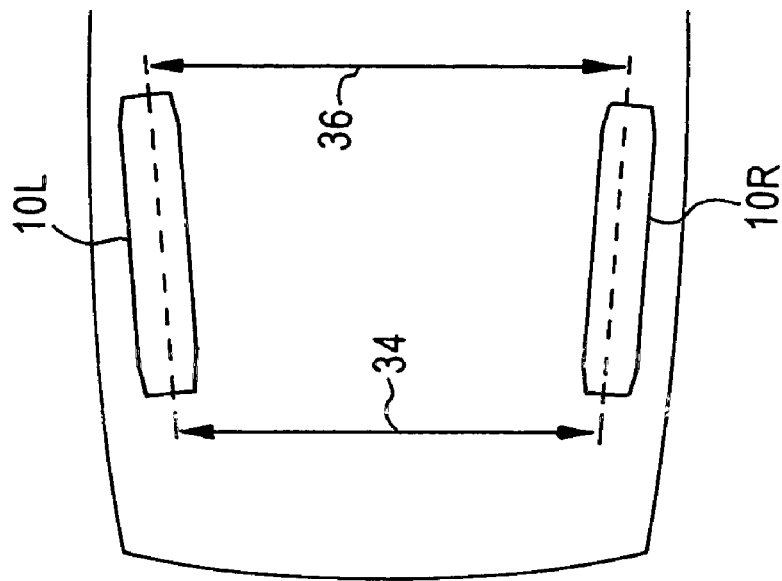
FIG. 3 is a bottom plan view of front wheels of a vehicle showing a toe of the wheels.
Figure 4:
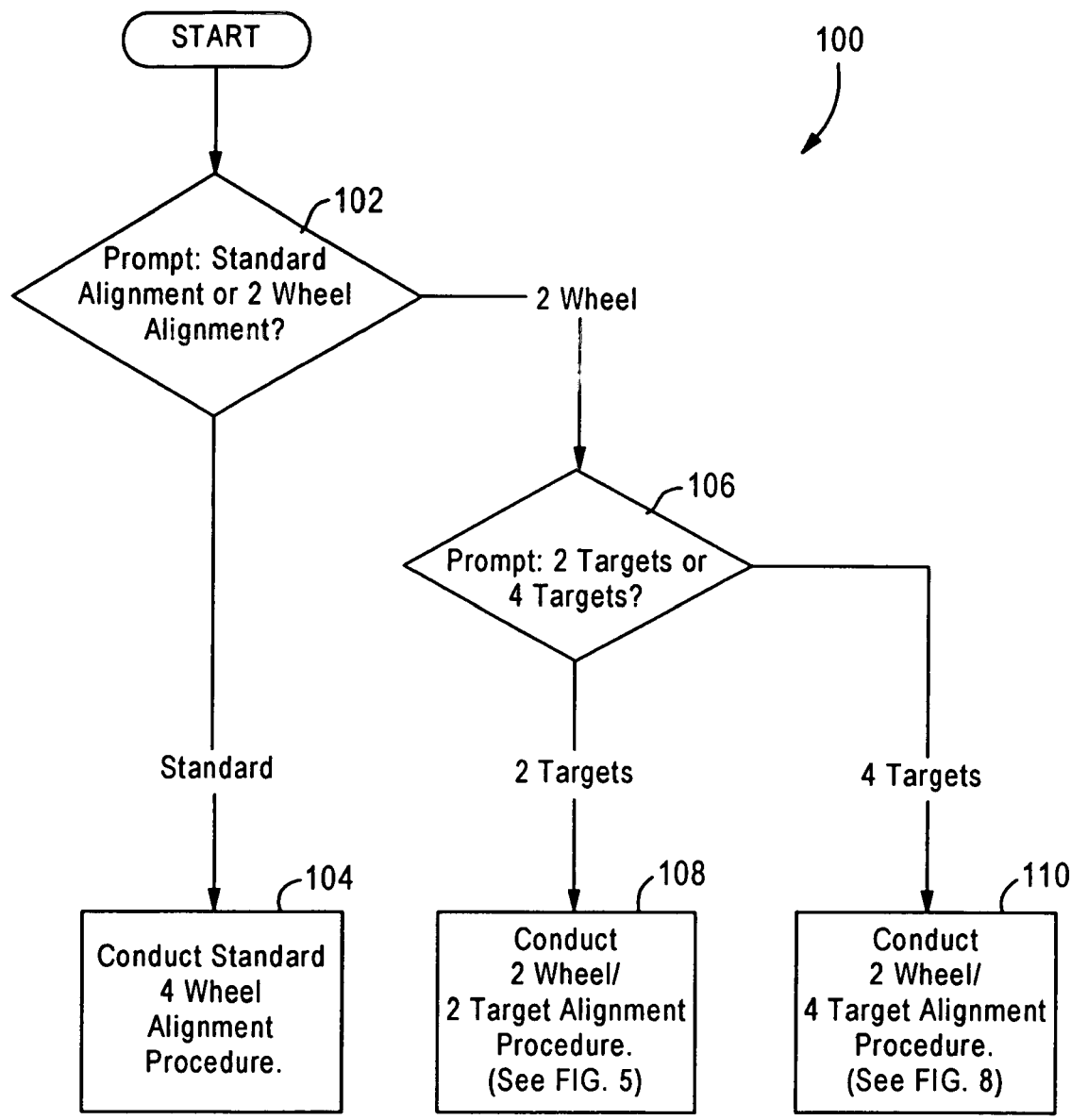
FIG. 4 is a flow chart illustrating a method according to the present disclosure for measuring and adjusting alignment of wheels of a vehicle.

Referring to FIG. 4, the present disclosure provides a method 100 for measuring and adjusting alignment of front wheels of a four wheel vehicle. However, before the method 100 of FIG. 4 is discussed, a description of some alignment properties of front wheels are provided in FIGS. 1 through 3.

Alignment Properties of Wheels of a Vehicle

During an alignment process, a number of parameters are measured and adjusted to achieve proper wheel alignment. These parameters can include, for example, camber, caster, steering axis inclination (SAI), toe, turning angle, thrust line, scrub radius and setback.

Figure 1:
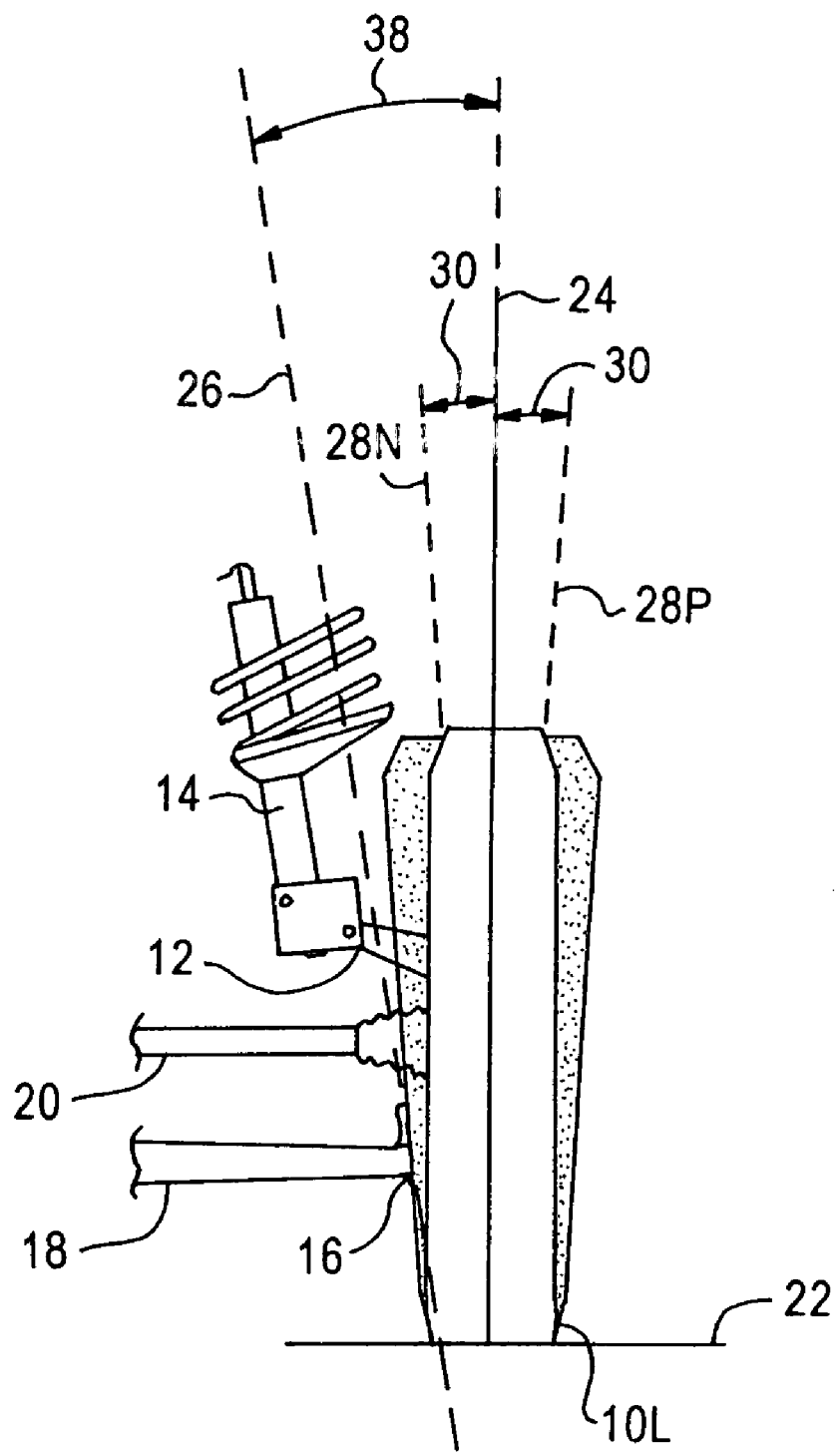
FIG. 1 is a front elevation view of a front wheel of a vehicle (e.g., an automobile having four wheels) showing alignment properties of the wheel, including positive and negative camber angles.

Referring first to FIG. 1, a front elevation view of an example of a left front wheel 10L of a vehicle (e.g., an automobile having four wheels) is shown. Connected to the wheel 10L through a first ball joint 12 is a shock-absorber assembly 14, and through a second ball joint 16 is a steering rod 18. The first ball joint 12 may simply comprise an adjustment point in later model automobiles. An axle 20 is also connected to the wheel 10L. The wheel 10L is shown supported on a ground plane 22 (e.g., a floor of an auto repair shop) and a "true vertical" line 24 is shown extending perpendicular from the ground plane 22 at about a center of a bottom of the wheel 10L, as viewed from the front. A steering pivot line 26 is shown passing through the ball joints 12, 16. Broken lines illustrate two possible centerlines 28N, 28P of the wheel 10L, as viewed from the front.

Still referring to FIG. 1, camber 30 is the angle, measured in degrees, between the front true vertical line 24 and the center line, 28P or 28N, of the wheel 10L, when viewed from the front of the vehicle. If the top of the wheel 10L is leaning out from the center of the car, as illustrated by the centerline 28P, then the camber 30 is positive. If the top of the wheel 10L is leaning in, as illustrated by the centerline 28N, then the camber 30 is negative. If the camber 30 is out of adjustment, it will cause tire wear on one side of the tire's tread. If the camber 30 is too far negative, for instance, then the tire will wear on the inside of the tread.

Still referring to FIG. 1, steering axis inclination (SAI) 38 is the measurement in degrees between the steering pivot line 26 and the true vertical line 24 when viewed from the front of the vehicle. This angle 38 causes the vehicle to lift slightly when the wheel 10L is turned away from a straight ahead position during driving. This action uses the weight of the vehicle to cause the steering wheel 10L to re-center when the steering wheel 10L is released after a turn is made. Because of this, if the SAI 38 is different from side to side, the SAI 38 will cause a pull at very slow speeds. Most alignment machines have a way to measure SAI 38; however it is usually not separately adjustable. The most likely cause for SAI 38 being out is bent parts which must be replaced to correct the condition. SAI 38 is also referred to as KPI (King Pin Inclination) on trucks and old cars with king pins instead of ball joints.

Included angle is the angle formed between the SAI 38 and the camber 30. Scrub radius is the distance at the road surface between the steering pivot line 26 and the true vertical line 24 of the wheel 10L. This distance must be exactly the same from side to side or the vehicle will pull strongly at all speeds.

Figure 2:
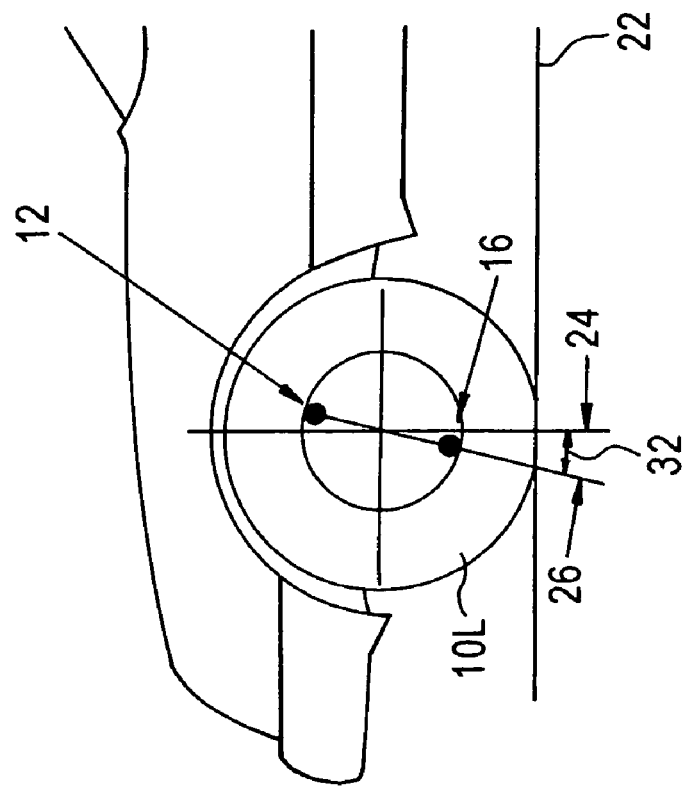
FIG. 2 is a side elevation view of a front wheel of a vehicle showing a steering pivot and a caster angle of the wheel.

Referring to FIG. 2, a side elevation view of the front wheel 10L is shown. The wheel 10L is shown supported on the ground surface 22 and the "true vertical" line 24 is shown extending perpendicular from the ground surface 22 at about a center of a bottom of the wheel 10L, as viewed from the side. Also illustrated is the steering pivot line 26 passing through the ball joints 12, 16.

Caster 32 is the angle, measured in degrees, between the steering pivot line 26 and the true vertical line 24 of the wheel 10L, when viewed from the side of the vehicle. If the top of the steering pivot line 26 is leaning toward the rear of the car, as illustrated in FIG. 2, then the caster 32 is positive. If the top of the steering pivot line 26 is leaning toward the front of the car, then the caster 32 is negative. If the caster 32 is out of adjustment, it can cause problems in straight line tracking of the vehicle.

FIG. 3 is a bottom plan view of a pair of wheels, a front left wheel 10L and a front right wheel 10R of a vehicle. Setback is when one front wheel is set further back than the other front wheel. A toe measurement is the difference between a distance 34 between the front of the tires 10L, 10R and a distance 36 between the back of the tires 10L, 10R. The toe is measured in fractions or decimals of an inch in the United States and is usually set close to zero which means that the wheels 10L, 10R are parallel with each other. Toe-in means that the distance 34 between the front of the wheels 10L, 10R is less than the distance 36 between the back of the wheels 10L, 10R, as illustrated in FIG. 3. Toe-out means that the distance 34 between the front of the wheels 10L, 10R is greater than the distance 36 between the back of the wheels. An incorrect toe setting will cause rapid tire wear to the tires of both wheels equally. When a vehicle is turned, the inner front wheel must toe-out more than the outer front wheel. Measurement of toes during turning is referred to as turning angle.

The method 100 of FIG. 4 can be used to measure and adjust, if necessary, the camber, caster, SAI, toe, turning angle, scrub radius and setback of the front wheels of a vehicle.

Method for Measuring and Adjusting Alignment of Front Wheels of a Vehicle

Referring to FIG. 4, the method 10 of the present disclosure generally includes prompting a user of the alignment apparatus to choose between a standard alignment procedure and a two-wheel alignment procedure, as shown at 102. A standard alignment procedure is then conducted if the user chooses a standard alignment, as shown at 104. The standard alignment procedure is carried out in accordance with existing conventional methods of measuring and adjusting the wheels of a vehicle using vision imaging alignment system. The standard alignment procedure, for example, includes mounting optically scannable targets to all wheels of the vehicle and conducting rear wheel compensation to establish accurate rear readings, and an accurate rear thrust angle.

If the user chooses a two-wheel alignment, however, the user is prompted to choose between two targets or four targets, as shown at 106. If the user chooses two targets, a two-wheel, two-target alignment procedure is conducted, as shown at 108, and if the user chooses four targets, a two-wheel, four-target alignment procedure is conducted, as shown at 110.

Figure 5:
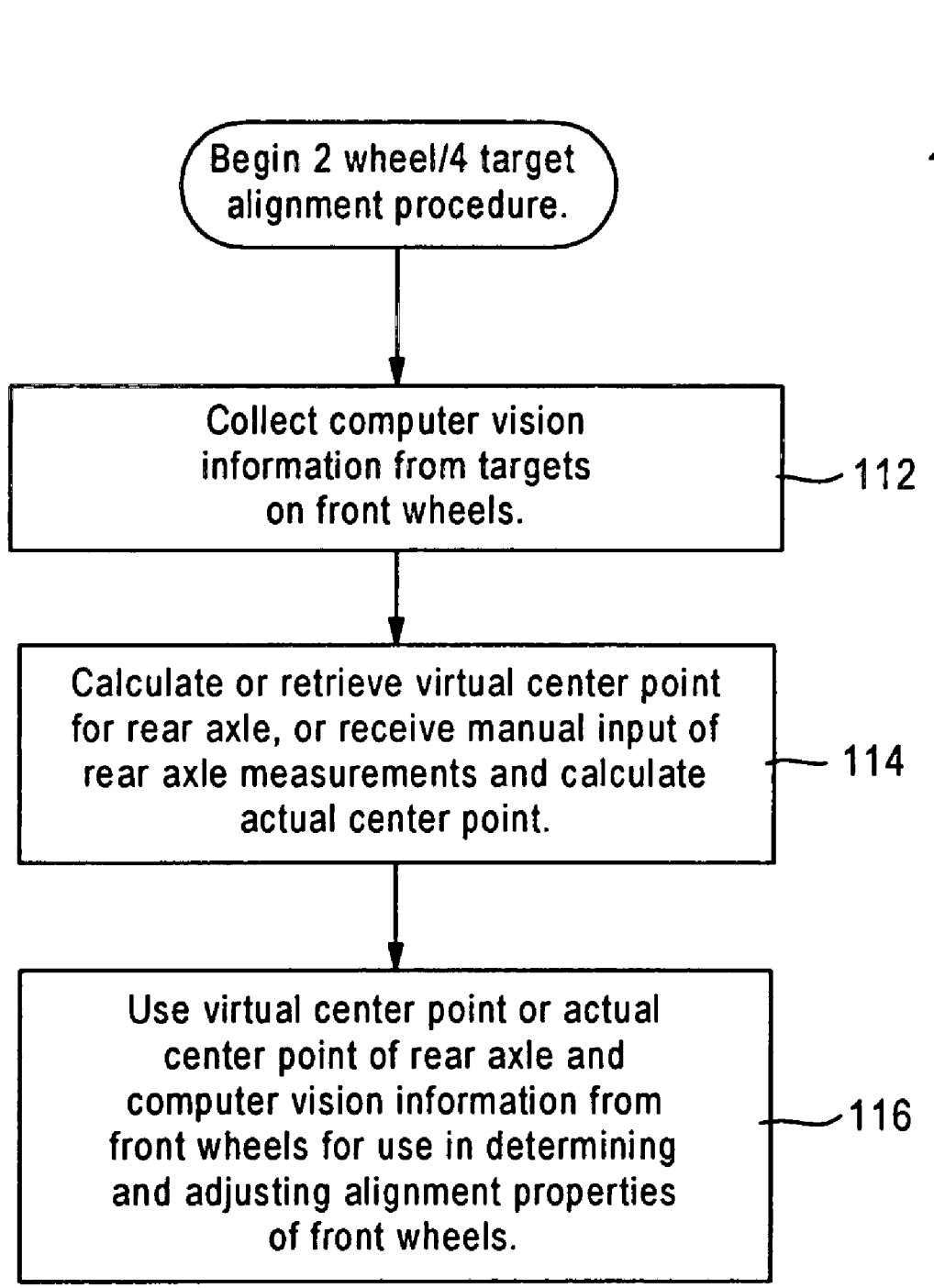
FIG. 5 is a flow chart illustrating a method according to the present disclosure for conducting a two-wheel and two-target alignment procedure.

Referring to FIG. 5, the two-wheel, two-target alignment procedure 108 includes instructing the user to mount optically scannable targets to two front wheels of the vehicle, and then obtaining images of the targets on the front wheels using optical scanning devices, as shown at 112. At 114, the method includes calculating or retrieving a virtual center point of a rear axle of the vehicle or receiving manual input, from the user, of rear axle measurements and then calculating the actual center point. Either of the virtual center point or the actual center point of the rear axle is then used and the images of the targets on the front wheels are then used to determine and adjust alignment properties of the front wheel, as show at 116.

Although not shown, step 114 of FIG. 5 can include prompting the user to choose between a virtual center point and an actual center point for a rear axle of the vehicle, and prompting the user to choose between a calculated and a retrieved virtual center point if the user selects the virtual center point. If the user selects the calculated virtual center point, the virtual center point is calculated using the images of the targets on the front wheels. For example, the calculation can be done by projecting the images of the targets on the front wheels to the rear wheels and calculating the virtual center point from the projected images.

If the user selects the retrieved virtual center point, a virtual center point is retrieved from a computer memory device that stores an average of center points of all vehicle previously aligned or manufacture-specified center points for particular vehicles. If the user selects the actual center point, the user is then prompted to enter actual measurements of rear wheels of the vehicle. Then, the actual center point is calculated using the actual measurements of the rear wheels.

Figure 6:
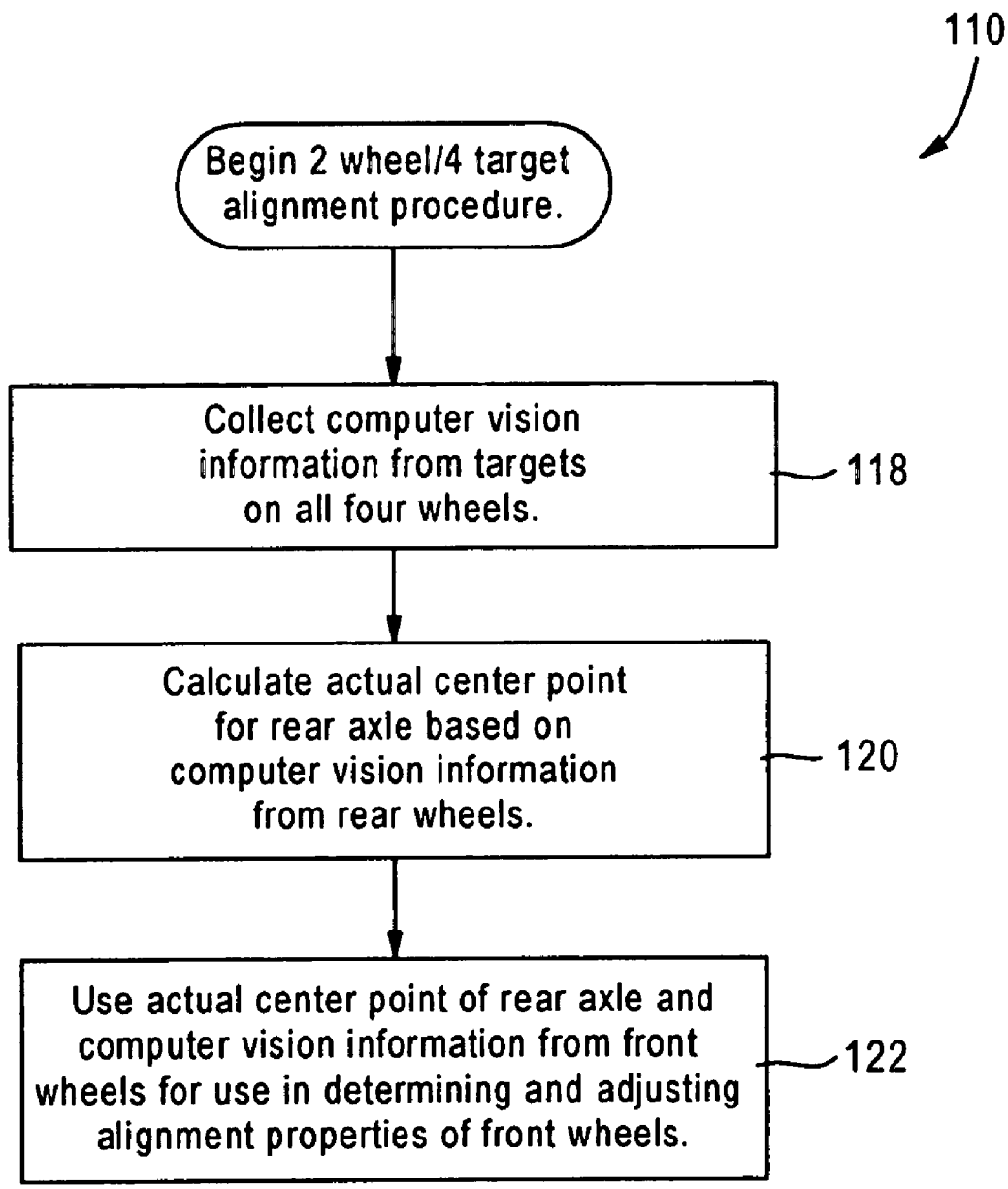
FIG. 6 is a flow chart illustrating a method according to the present disclosure for conducting a two-wheel and four-target alignment procedure.

Referring to FIG. 6, the two-wheel, four-target alignment procedure 110 includes instructing the user to mount optically scannable targets to front wheels and rear wheels of the vehicle, and obtaining images of the targets on the wheels using optical scanning devices, as shown at 118. A scanned, or actual, center point is then calculated using the images of the targets on the rear wheels, as shown at 120, and the actual center point of the rear axle of the vehicle and the images of the targets on the front wheels are then used to measure and adjust alignment properties of the front wheels, as shown at 122. Although not shown, a thrust angle of the rear wheels can also be determined using the images of the targets on the rear wheels and the thrust angle used to determine front toe settings. Rear wheel compensation for run out is not done, so the thrust angle is approximate. A plane of the rear wheels can also be determined using the images of the targets on the rear wheels.

The methods 100, 108 and 110 of FIGS. 4 through 6 can be used to measure and adjust camber, caster, steering axis inclination, toe, turning angle, thrust line, scrub radius and setback for the front wheels. The alignment procedures can include raising the front wheels and conducting individual wheel positioning on the front wheels, and lowering the front wheels and settling a suspension of the vehicle. The alignment procedures can further include, for example, adjusting the front toe so that a steering wheel of the vehicle is in a straight position, after measuring and correcting alignment properties of the front wheels.

Figure 7:
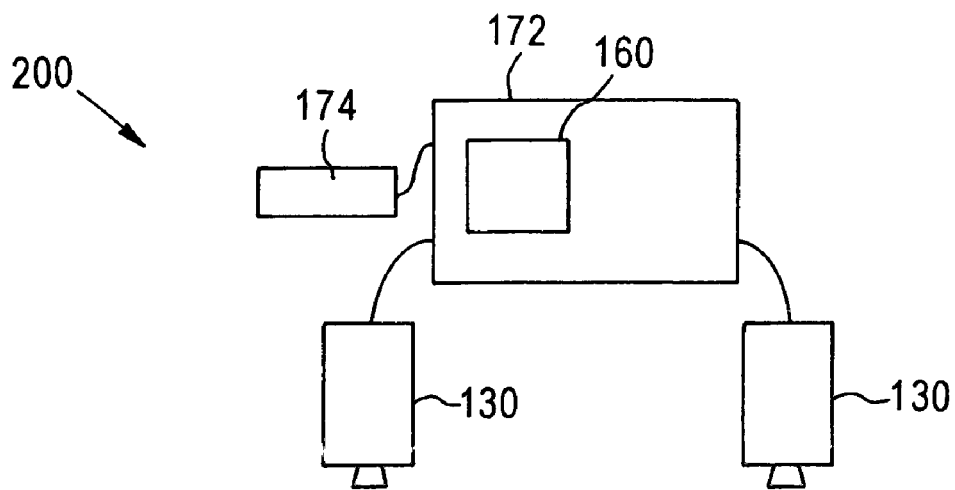
FIG. 7 is a perspective view of an exemplary embodiment of a computer-aided, three-dimensional (3D) machine vision alignment apparatus, which can be used for carrying out the methods of FIGS. 4 through 6.
Figure 7:
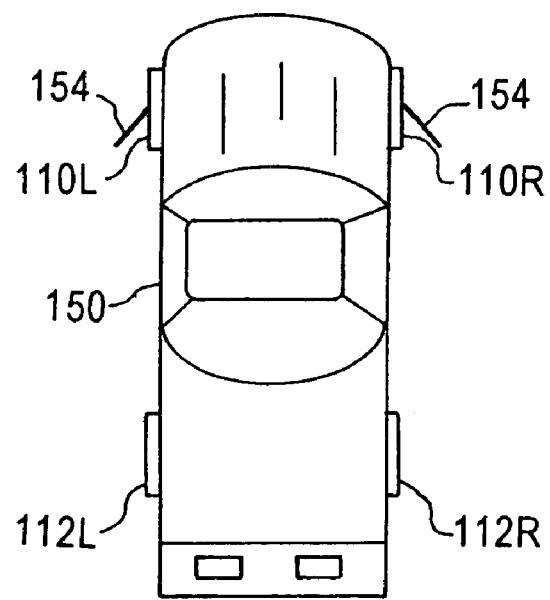
Figure 7:
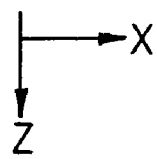

Preferably, the methods 100, 108 and 10 of FIGS. 4 through 6 are conducted using a computer-aided, vision imaging, three-dimensional wheel alignment apparatus 200 ("alignment apparatus"), such as the type shown in FIG. 7. The Visualiner 3D$^3$ Arago™ Aligner (Model # EEWA533A), for example, is an alignment apparatus that can be used to determine the alignment properties of the wheels of a vehicle in accordance with the present invention, and is available from the John Bean Company of Conway, Ark. (wwwjohnbean.com). The Visualiner 3D$^3$ Arago™ aligner advances "error-free" alignment technology with the use of three self-synchronizing digital cameras and automatic height indexing (although, FIG. 7 only shows a two cameras). It should be noted though that the presently disclosed methods 100, 108, 110 are not meant to be limited to a particular wheel alignment apparatus, and can be carried out using other types of computer-aided alignment systems, such as a single-camera alignment apparatus or alignment systems using head units which attach to various wheels and communicate with cables or optical sensors.

Alignment Apparatus

FIG. 7 is a block diagram illustrating an exemplary embodiment of an vision imaging alignment apparatus 200 that can be used for measuring and adjusting the alignment of front wheels 110L and 110R of a vehicle 150 in accordance with the present invention. The vehicle 150 also includes rear wheels 112L and 112R, and target assemblies 154 having defined patterns or shapes are affixed to the front wheels 10L and 10R of the vehicle 150. Although not shown, targets 154 may also be attached to the rear wheels 112L and 1112R.

The alignment apparatus 200 includes two optical sensing means 130 each having an interface to an electronic processing means 160. In the depicted embodiment, each of the optical sensing means 130 is a camera, and the processing means 160 is a computer system. The computer 160 preferably includes a visual display unit 172 and an operator interface or input means 174 such as a keyboard or remote input device. Computer-generated quasi-three-dimensional (3D) representation of the wheels being aligned may be depicted on the display unit 172 along with indicia of the detected alignment. In addition, the display unit 172 may depict hints or suggestions to guide the alignment technician who is performing the wheel alignment. The computer 160 also includes data storage means for storing predetermined automotive dynamic stability tolerance data.

Each of the optical sensors 130 can view at least one of the target assemblies 154 mounted on the wheels, and form an image thereof as viewed from the perspective of the sensing means. Electronic signals corresponding to the images are transferred to processing means 160 which correlates the detected perspective image of each target 154 with the known true shape and orientation of reference data. In so doing, the computer 160 relates the perceived dimensions of certain known geometric elements on each target 154 with the orientation and dimensions of corresponding reference data. In this manner, the alignment apparatus 200 can determine the position and attitude of each front wheel 1110L, 110R of the vehicle 150.

In an exemplary operation, the alignment apparatus 200 works generally as follows: the targets 154 are mounted onto each of the front wheels 110L, 110R; the alignment apparatus 200 forms a detected image of each target 154; and the detected images are processed in the computer 160, which calculates the orientation of each of the targets 154. The computer 160 also stores values corresponding to the position of each detected image.

Typically, the rotation axis or spindle position of each front wheel 10L, 10R is also located. In this operation, the computer 160 acquires images of the targets 154. The front of the vehicle 150 is elevated, the front wheels 110L, 110R are rotated, and the computer 160 acquires a second set of images of the targets 154. The computer 160 computes the angle through which the wheels were rotated, and based on such calculation, determines the spindle location of each wheel. The computer 160 may then calculate the actual orientation of the primary planes of each of the front wheels 10L, 110R. A primary plane or claw plane is an imaginary plane at an outer face of the wheel with a generally vertical orientation that is parallel to the tread of the tire that is part of the wheel.

The results of the computations described above are displayed on the display unit 172. The computer 160 may also have the display unit 172 show instructions to the alignment technician as to what corrections may need to be made to correct any detected misalignment of the front wheels 10L, 110R.

Figure 9:
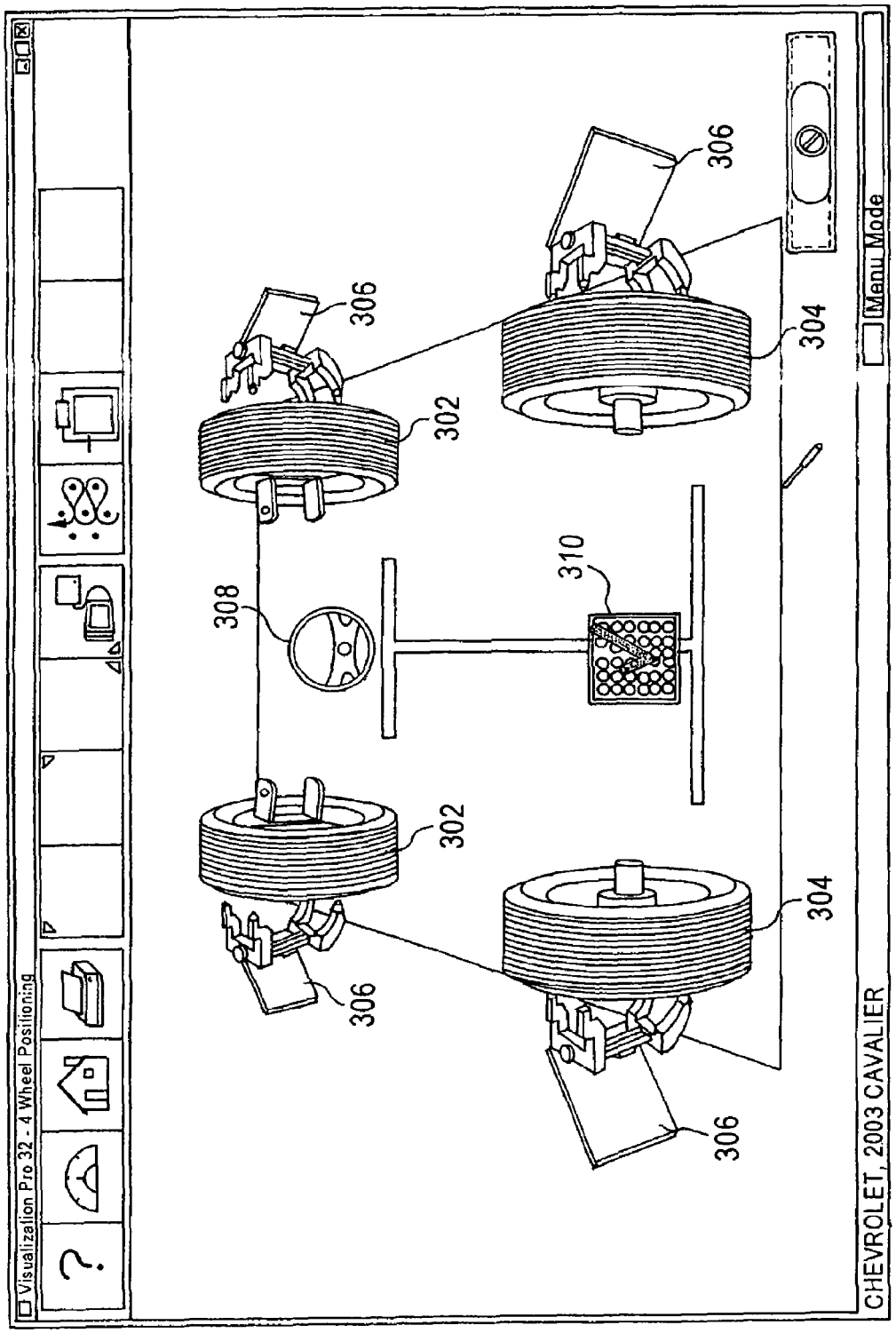
FIG. 9 is an exemplary embodiment of an interactive display according to the present disclosure as shown on a monitor of the alignment apparatus of FIG. 7.

FIG. 9 is an exemplary embodiment of an interactive display 300 as shown on the display unit 172 of the alignment apparatus 200 of FIG. 7. The interactive display 300 shows imaginary front wheels 302 and rear wheels 304 of a four wheel vehicle, and targets 306 mounted on all wheels. A steering wheel 308 is placed between the front wheels 302 to indicate that they are the front wheels. A check box 310 is placed between the rear wheels 304 and allows a technician to click on the box 310 (using a mouse for example) to indicate that the rear targets will not be used and that the technician desires the two-wheel, two-target alignment procedure 108, as shown in FIG. 5.

Referring back to FIG. 7, the computer 160 also can calculate a roll radius and a roll axis of each front wheel 110L, 110R according to known methods. The roll radius values are then used to determine the location of the ground plane, (minus corrections for tire flex). The steering axis can be determined using an inclinometer, as is known in the art, or using the aligner, and the centerlines of the wheel 110L, 110R can be determined using an electronic wheel width caliper. Alternatively, some alignment properties, such as the roll radius, may be measured manually by the alignment technician using a measurement tape or the equivalent to determine the distance between the center of each of the wheels 110L, 110R and the point on the outer edge of the wheels directly beneath the centers of the wheels. This roll radius measurement may then be input to the alignment apparatus 200. The alignment apparatus 200 may perform other required measurements, and further perform calculations and/or comparisons of the results and display the results of such measurements, calculations, and comparisons.

Camber, caster, and SAI are typically measured using inclinometers attached to the wheels 110L, 110R. With camber, the inclinometer measures the angle that the plane of the wheel makes with the vertical. To measure caster, the wheels 110L, 110R are each turned through an arc, and the difference in the camber readings is used to derive the caster value. This procedure is called a caster swing. SAI is measured in a manner similar to caster, except that the inclinometer used for the SAI reading measures the change in pitch angle of a line in the plane of the wheel as the wheel is turned through an arc.

Once the alignment measurements are determined, the alignment apparatus 200 presents resulting values on the display unit 172 for evaluation. The alignment technician can then use such results to help diagnose the condition of the vehicle, the vehicle suspension, and the wheels 110L, 110R. In addition, the alignment apparatus 200 is preferably programmed to compare the resulting values for each wheel 110L, 110R to the manufacturer-specified alignment properties. The alignment apparatus 200 can highlight any measurement that is not substantially equal to, or within a specified tolerance of, the manufacturer-specified value, such as by generating a warning message to alert the alignment technician.

Computer Hardware

Figure 8:
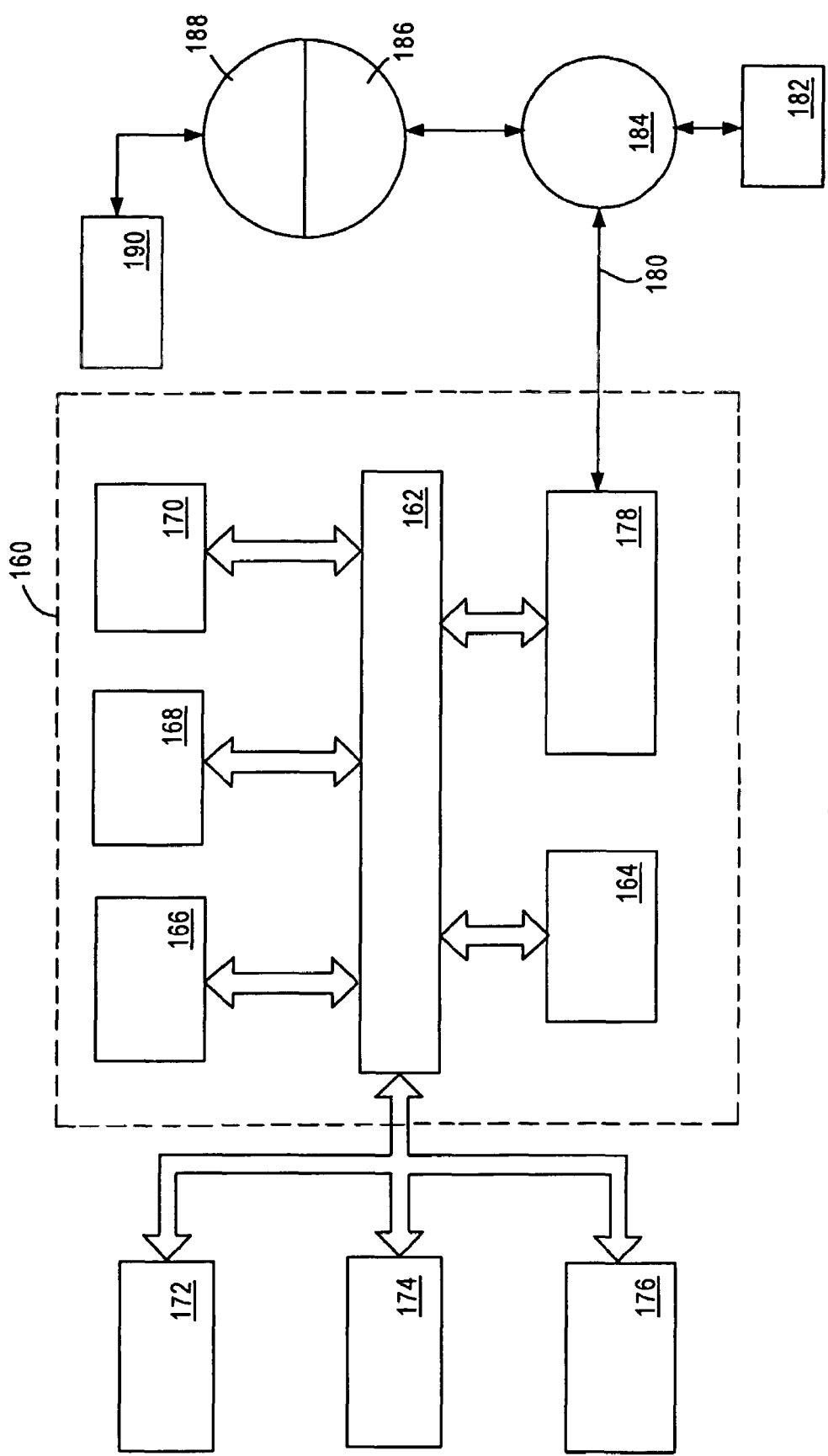
FIG. 8 is a block diagram of an exemplary embodiment of a computer of the alignment apparatus of FIG. 7.

FIG. 8 is a block diagram illustrating in greater detail the computer 160 for use with the alignment apparatus 200 of FIG. 7. The computer 160 includes a bus 162 or other communication mechanism for communicating information, a processor 164 coupled to the bus 162 for processing information, and a main memory 166, such as a random access memory (RAM) or other dynamic storage device, coupled to the bus 162 for storing information and instructions to be executed by the processor 164. The main memory 166 also may be used for storing temporary variables or other intermediate information during execution of instructions to be executed by the processor 164. The computer 160 also includes a read only memory (ROM) 168 or other static storage device coupled to the bus 162 for storing static information and instructions for the processor 164, and a storage device 170, such as a magnetic disk or optical disk, is provided and coupled to the bus 162 for storing information and instructions. As shown, in addition to the display 172 and the keyboard 174, the computer 160 may also include a cursor control 176, such as a mouse.

The computer 160 is used for measuring and adjusting alignment of front and rear wheels of a four wheel vehicle, by carrying out the methods 100 and 200 of the present disclosure. According to one aspect, measuring and adjusting the alignment of front and rear wheels of a four wheel vehicle is provided by the computer 160 in response to the processor 164 executing one or more sequences of one or more instructions contained in the main memory 166. Such instructions may be read into the main memory 166 from another computer-readable medium, such as the storage device 170. Execution of the sequences of instructions contained in the main memory 166 causes the processor 164 to perform the methods provided by the present disclosure. In alternative embodiments, hard-wired circuitry may be used in place of or in combination with software instructions to implement the present disclosure. Thus, the present disclosure is not limited to any specific combination of hardware circuitry and software.

The term "computer-readable medium" as used herein refers to any medium that participates in providing instructions to the processor 164 for execution. Such a medium may take many forms, including but not limited to, non-volatile media, volatile media, and transmission media. Non-volatile media includes, for example, optical or magnetic disks, such as storage device 170. Volatile media includes dynamic memory, such as the main memory 166. Transmission media includes coaxial cables, copper wire and fiber optics, including the wires that comprise bus 162. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 164 for execution. For example, the instructions may initially be carried on a magnetic disk of a remote computer. The remote computer can load the instructions into its dynamic memory and send the instructions over a telephone line using a modem. A modem local to computer 160 can receive the data on the telephone line and use an infra-red transmitter to convert the data to an infra-red signal. An infra-red detector can receive the data carried in the infra-red signal and appropriate circuitry can place the data on bus 162. The bus 162 carries the data to the main memory 166, from which the processor 164 retrieves and executes the instructions. The instructions received by the main memory 166 may optionally be stored on the storage device 170 either before or after execution by the processor 164.

The computer 160 also includes a communication interface 178 coupled to the bus 162. The communication interface 178 provides a two-way data communication coupling to a network link 180 that is connected to a local network 182. For example, the communication interface 178 may be an integrated services digital network (ISDN) card or a modem to provide a data communication connection to a corresponding type of telephone line. As another example, the communication interface 178 may be a local area network (LAN) card to provide a data communication connection to a compatible LAN. Wireless links may also be implemented. In any such implementation, communication interface 178 sends and receives electrical, electromagnetic or optical signals that carry digital data streams representing various types of information.

The network link 180 typically provides data communication through one or more networks to other data devices. For example, the network link 180 may provide a connection through local network 182 to a host computer 184 or to data equipment operated by an Internet Service Provider (ISP) 186. The ISP 186 in turn provides data communication services through the world wide packet data communication network now commonly referred to as the "Internet" 188. Local network 182 and Internet 188 both use electrical, electromagnetic or optical signals that carry digital data streams. The signals through the various networks and the signals on network link 180 and through communication interface 178, which carry the digital data to and from computer 60, are exemplary forms of carrier waves transporting the information.

The computer 160 can send messages and receive data, including program code, through the network(s), network link 180 and communication interface 718. In the Internet example, a server 190 might transmit a requested code for an application program through Internet 188, ISP 186, local network 182 and communication interface 178. In accordance with the present disclosure, one such downloaded application provides for measuring and adjusting the alignment of front and rear wheels of a four wheel vehicle as previously described.

The received code may be executed by the processor 164 as it is received, and/or stored in the storage device 170, or other non-volatile storage for later execution. In this manner, the computer 160 may obtain application code in the form of a carrier wave.

Thus, the present disclosure provides methods 100, 108, 110 and an apparatus 200 for measuring and adjusting alignment of front wheels of a four wheel vehicle. The methods 100, 108, 110 can be provided in one or more sequences of instructions carried on a computer-readable medium and executable by one or more processors. The specific methods and apparatus described in this specification have been presented by way of illustration rather than limitation, and various modifications, combinations and substitutions may be effected by those skilled in the art without departure either in spirit or scope from this disclosure in its broader aspects and as set forth in the appended claims. All methods and apparatus disclosed herein, and all elements thereof, are contained within the scope of at least one of the following claims. No elements of the presently disclosed methods and apparatus are meant to be disclaimed.

What is claimed is:

1. A method for measuring and aligning wheels of a vehicle comprising:
   using a machine vision alignment apparatus including optical scanning devices and optically scannable targets, said machine vision alignment apparatus performing the steps of prompting a user of the machine vision alignment apparatus to choose between a standard alignment and a two-wheel alignment;

conducting a standard alignment based on images of the targets formed with the optical scanning devices if the user chooses a standard alignment; and conducting a two-wheel, two-target alignment procedure using the optical scanning devices based on the images of the targets if the user chooses a two-wheel alignment;

wherein the two-wheel, two-target alignment procedure comprises:

instructing the user to mount optically scannable targets to two front wheels of the vehicle;

obtaining images of the targets on the front wheels using optical scanning devices;

prompting the user to choose between a virtual center point and an actual center point for a rear axle of the vehicle;

prompting the user to choose between a calculated and a retrieved virtual center point if the user selects the virtual center point;

calculating the virtual center point using the images of the targets on the front wheels if the user selects the calculated virtual center point;

retrieving a virtual center point from a computer memory device if the user selects the retrieved virtual center point;

prompting the user to enter actual measurements of rear wheels of the vehicle if the user selects the actual center point;

calculating the actual center point of the rear axle using the actual measurements of the rear wheels; and using the calculated virtual center point or the calculated actual center point of the rear axle of the vehicle and the images of the targets on the front wheels to measure and adjust alignment properties of the front wheels.

2. The method of claim 1, wherein the alignment properties of the front wheels include at least one of camber, caster, steering axis inclination, toe, turning angle, thrust line, scrub radius and setback.

3. The method of claim 1, wherein the alignment procedures include raising the front wheels and conducting individual wheel positioning on the front wheels.

4. The method of claim 3, wherein the alignment procedures further include lowering the front wheels and settling a suspension of the vehicle.

5. The method of claim 3, wherein the alignment procedures further include conducting a caster swing on the front wheels when raised.

6. The method of claim 2, further comprising adjusting the front toe so that a steering wheel of the vehicle is in a straight position.

7. The method of claim 1, wherein each of the alignment procedures includes comparing measured alignment properties of the front wheels to manufacture-specified alignment properties of the front wheels.

8. The method of claim 1, wherein the method is provided in one or more sequences of instructions carried on a computer-readable storage medium and executable by one or more processors.

9. A machine vision alignment apparatus for measuring and aligning wheels of a vehicle, comprising:

optically scannable targets attachable to the wheels;

optical scanning devices for providing images of the targets; and a data processor operatively connected to the optical scanning devices and programmed to:

prompt a user of said machine vision alignment apparatus to choose between a standard alignment and a two-wheel alignment;

conduct a standard alignment based on the images of the targets if the user chooses a standard alignment; and conduct a two-wheel, two-target alignment procedure based on the images of the targets using the optical scanning devices if the user chooses a two-wheel alignment;

wherein the two-wheel, two-target alignment procedure comprises: instructing the user to mount optically scannable targets to two front wheels of the vehicle;

obtain images of the targets on the front wheels using optical scanning devices;

prompting the user to choose between a virtual center point and an actual center point for a rear axle of the vehicle;

prompting the user to choose between a calculated and a retrieved virtual center point if the user selects the virtual center point;

calculating the virtual center point using the images of the targets on the front wheels if the user selects the calculated virtual center point;

retrieving a virtual center point from a computer memory device if the user selects the retrieved virtual center point;

prompting the user to enter actual measurements of rear wheels of the vehicle if the user selects the actual center point;

calculating the actual center point of the rear axle using the actual measurements of the rear wheels; and using the calculated virtual center point or the calculated actual center point of the rear axle of the vehicle and the images of the targets on the front wheels to measure and adjust alignment properties of the front wheels.

10. The machine vision alignment apparatus according to claim 9, wherein the alignment properties of the front wheels include at least one of camber, caster, steering axis inclination, toe, turning angle, thrust line, scrub radius and setback.

11. The machine vision alignment apparatus according to claim 9, further comprising a computer memory device storing manufacture-specified alignment properties of the front wheels, wherein the computer memory device is connected to the data processor, and the data processor is further programmed to compare measured alignment properties of the front wheels to the manufacture-specified alignment properties of the front wheels.

* * * * *